United States Patent
Landry

(10) Patent No.: US 11,186,435 B2
(45) Date of Patent: Nov. 30, 2021

(54) RECEPTACLE FOR YARD WASTE

(71) Applicant: Frederick Martin Landry, Springfield, VA (US)

(72) Inventor: Frederick Martin Landry, Springfield, VA (US)

( * ) Notice: Subject to any disclaimer, the term of this patent is extended or adjusted under 35 U.S.C. 154(b) by 84 days.

(21) Appl. No.: 16/862,265

(22) Filed: Apr. 29, 2020

(65) Prior Publication Data
US 2021/0339945 A1  Nov. 4, 2021

(51) Int. Cl.
| | |
|---|---|
| *B65F 1/06* | (2006.01) |
| *B65F 1/16* | (2006.01) |
| *B65F 1/14* | (2006.01) |
| *B62B 1/14* | (2006.01) |
| *B62B 5/06* | (2006.01) |
| *B62B 5/00* | (2006.01) |
| *B62B 1/12* | (2006.01) |

(52) U.S. Cl.
CPC .............. *B65F 1/06* (2013.01); *B62B 1/12* (2013.01); *B62B 1/14* (2013.01); *B62B 5/00* (2013.01); *B62B 5/06* (2013.01); *B65F 1/1405* (2013.01); *B65F 1/1473* (2013.01); *B65F 1/16* (2013.01); *B62B 2202/20* (2013.01); *B65F 2240/138* (2013.01); *B65F 2250/11* (2013.01); *B65F 2250/114* (2013.01); *B65F 2250/12* (2013.01)

(58) Field of Classification Search
CPC .. B65F 1/06; B65F 1/16; B65F 1/1405; B65F 1/1473; B65F 2250/12; B65F 2250/11; B65F 2240/138; B65F 2250/114; B62B 5/00; B62B 1/12; B62B 1/14; B62B 5/06; B62B 2202/20
See application file for complete search history.

(56) References Cited

U.S. PATENT DOCUMENTS

| | | | | |
|---|---|---|---|---|
| 2,689,745 | A | * | 9/1954 | Rosenberry ............... B62B 1/26 280/47.26 |
| 3,687,408 | A | * | 8/1972 | Lake ................... B65B 67/1205 248/97 |
| 3,866,936 | A | * | 2/1975 | Hedges ..................... B62B 3/12 280/47.26 |
| 3,893,699 | A | * | 7/1975 | Morris .................... B62B 3/106 280/659 |
| 4,194,654 | A | * | 3/1980 | Badger ................. B65F 1/1415 248/97 |
| 4,357,728 | A | * | 11/1982 | Pravettone .............. A47L 13/52 141/108 |
| 4,442,567 | A | * | 4/1984 | Pravettone .............. A47L 13/52 141/108 |
| 4,521,043 | A | * | 6/1985 | Wilsford ................... B65F 1/10 294/214 |
| 4,749,158 | A | * | 6/1988 | Buckley .................... B62B 1/12 248/129 |

(Continued)

Primary Examiner — Jacob B Meyer

(57) ABSTRACT

The receptacle for yard waste will allow the user to quickly combine the collecting, compacting and bagging of leaves and yard waste by providing a single receptacle that a user can collect yard waste into a bag within, and then compact. The bag is quick and easy to install within the receptacle, and is removed through the front opening so that the user doesn't have to lift the compacted bag out of the top of the receptacle. The front opening also makes it possible to do away with the step of having to eliminate one or more air pockets between a traditional plastic yard waste bag and the bagging container.

19 Claims, 6 Drawing Sheets

(56) References Cited

U.S. PATENT DOCUMENTS

| | | | | |
|---|---|---|---|---|
| 4,953,744 A * | 9/1990 | Koyama | B65F 1/06 | 220/495.11 |
| 5,031,277 A * | 7/1991 | Coker | A47L 11/4013 | 15/257.3 |
| 5,048,778 A * | 9/1991 | Wright | B62B 1/266 | 248/98 |
| 5,069,405 A * | 12/1991 | Keating | B65B 67/12 | 248/98 |
| 5,088,531 A * | 2/1992 | Wade | A47L 13/52 | 141/108 |
| 5,180,125 A * | 1/1993 | Caveney | A47L 13/52 | 141/314 |
| 5,195,765 A * | 3/1993 | Lacey, Jr. | B62B 3/106 | 248/101 |
| 5,361,978 A * | 11/1994 | Monroe | B65F 1/06 | 220/908 |
| 5,901,872 A * | 5/1999 | Zollinhofer | B65F 1/06 | 220/573 |
| 5,971,410 A * | 10/1999 | Nichols | B62B 1/18 | 280/47.31 |
| 5,984,134 A * | 11/1999 | Mario | B65F 1/06 | 220/495.11 |
| 6,082,574 A * | 7/2000 | Johnson | B65F 1/02 | 220/23.91 |
| 6,179,151 B1 * | 1/2001 | Radvansky | B65F 1/06 | 220/4.23 |
| 6,202,922 B1 * | 3/2001 | Phillips | B65F 1/062 | 220/908 |
| 6,318,588 B1 * | 11/2001 | Lichtenwalner | B65F 1/02 | 220/908 |
| 6,367,822 B1 * | 4/2002 | Hutchins | B62B 1/10 | 248/99 |
| 6,585,304 B1 * | 7/2003 | Boozer | B62B 1/208 | 220/6 |
| 6,722,672 B2 * | 4/2004 | Cates | B62B 1/10 | 280/47.26 |
| D494,334 S * | 8/2004 | Chen | D34/19 | |
| 6,874,797 B2 * | 4/2005 | Gardenour | B62B 1/147 | 220/9.2 |
| 6,994,302 B1 * | 2/2006 | Simmons | B65B 67/1238 | 141/390 |
| 7,107,934 B1 * | 9/2006 | Hanks | A01K 1/0107 | 119/165 |
| D533,701 S * | 12/2006 | Payton | D34/5 | |
| 7,192,037 B1 * | 3/2007 | Pena | B65F 1/10 | 15/257.3 |
| 7,543,870 B2 * | 6/2009 | Schwartz | B62D 63/061 | 220/9.2 |
| 7,922,029 B1 * | 4/2011 | Aretz | B65F 1/068 | 220/661 |
| 8,104,778 B1 * | 1/2012 | Rojas | B62B 1/266 | 280/47.27 |
| 8,152,014 B2 * | 4/2012 | Elstone, Sr. | B65D 19/12 | 220/6 |
| 8,770,454 B1 * | 7/2014 | Lutz | B65F 1/1468 | 224/625 |
| 8,820,568 B1 * | 9/2014 | Antos | B65F 1/068 | 220/495.06 |
| 8,910,857 B1 * | 12/2014 | Hegarty | D06F 95/002 | 232/1 B |
| 8,919,708 B1 * | 12/2014 | Graves | B65B 67/04 | 248/101 |
| 9,089,318 B2 * | 7/2015 | Henniges | A61B 50/24 | |
| 9,266,671 B2 * | 2/2016 | Prescott | B65F 1/1405 | |
| 9,290,194 B1 * | 3/2016 | Catinchi | B65F 1/1415 | |
| 9,611,094 B1 * | 4/2017 | Cooper | B65F 1/04 | |
| 9,745,128 B2 * | 8/2017 | Romano | B65F 1/068 | |
| 10,017,198 B1 * | 7/2018 | Stamper | B65F 1/1468 | |
| 10,118,763 B2 * | 11/2018 | Ramirez | B65F 1/1468 | |
| 2001/0045718 A1 * | 11/2001 | Boirum | E04G 5/00 | 280/47.26 |
| 2003/0006237 A1 * | 1/2003 | Passantino | B65F 1/068 | 220/495.06 |
| 2003/0168461 A1 * | 9/2003 | Richardson | B65F 1/068 | 220/661 |
| 2009/0243240 A1 * | 10/2009 | Boustred | B65F 1/1468 | 280/47.19 |
| 2010/0154663 A1 * | 6/2010 | Harari | B65F 1/1405 | 100/229 A |
| 2011/0297017 A1 * | 12/2011 | Brown | B65F 1/06 | 100/237 |
| 2013/0048641 A1 * | 2/2013 | Romano | B65F 1/068 | 220/495.08 |
| 2014/0246439 A1 * | 9/2014 | Friedman | B65F 1/068 | 220/495.11 |
| 2016/0194150 A1 * | 7/2016 | Romano | B65F 1/062 | 220/4.01 |
| 2017/0369240 A1 * | 12/2017 | Soule | B65F 1/068 | |
| 2019/0168962 A1 * | 6/2019 | Smith | B65F 1/068 | |

* cited by examiner

RECEPTACLE FOR YARD WASTE

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

BACKGROUND OF THE INVENTION

The following includes information that may be useful in understanding the present invention(s). It is not an admission that any of the information provided herein is prior art, or material, to the presently described or claimed inventions, or that any publication or document that is specifically or implicitly referenced is prior art.

1. Field of the Invention

The present invention relates generally to the field of yard waste receptacles. More specifically, the invention is a receptacle for collecting, compacting, and bagging leaves and other yard waste.

2. Description of the Related Art

Many people collect their yard waste in a trash can or green waste can with a plastic or similar bag, and then put it out on the curb for pick up. Picking up leaves and other yard waste can be time consuming as in addition to the time it takes to gather and bag such yard waste, there is considerable amount of time spent on lining a receptacle with a bagging apparatus. In addition, typical bagging solutions require an ordinary user to avoid generating heavy bags to be able to lift and maneuver. This is time consuming thereby requiring the user to fill the receptacle increased and ultimately an unnecessary amount of times.

One solution to this problem is a compacting receptacle, such as the compacting trash receptacles some cities and national parks have installed on public streets. A problem with these receptacles and typical bagging solutions is the necessity of eliminating air pockets between the waste bag and the bagging container, thereby avoiding wasted space problems with air pockets during bagging. Another problem with the currently available receptacles is that the bag must be lifted out the top of the bin after filling. After filling, a bag is usually heavy and bulky, making it difficult to lift straight up.

Ideally, a receptacle for collecting, compacting, and bagging leaves and other yard waste should provide a user with an easy way to collect, compact, and bag yard waste without having to spend a lot of time fiddling with a bag or lifting heavy bags and, yet would operate reliably and be manufactured at a modest expense. Thus, a need exists for a reliable a receptacle for collecting, compacting, and bagging leaves and other yard waste to avoid the above-mentioned problems.

BRIEF SUMMARY OF THE INVENTION

In view of the foregoing disadvantages inherent in the known yard waste receptacle art, the present invention provides a novel receptacle for collecting, compacting, and bagging leaves and other yard waste. The general purpose of the present invention, as will be described subsequently in greater detail, is to provide a receptacle for collecting, compacting, and bagging leaves and other yard waste.

The invention will allow the user to quickly combine the collecting, compacting and bagging of leaves and yard waste by providing a single receptacle that a user can collect yard waste into a bag within, and then compact. The bag is quick and easy to install within the receptacle, and is removed through the front opening so that the user doesn't have to lift the compacted bag out of the top of the receptacle. The front opening also makes it possible to do away with the step of having to eliminate one or more air pockets between a traditional plastic yard waste bag and the bagging container.

The present invention holds significant improvements and serves as a receptacle for collecting, compacting, and bagging leaves and other yard waste. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as described herein without necessarily achieving other advantages as may be taught or suggested herein. The features of the invention that are believed to be novel are particularly pointed out and distinctly claimed in the concluding portion of the specification. These and other features, aspects, and advantages of the present invention will become better understood with reference to the following drawings and

BRIEF DESCRIPTION OF THE DRAWINGS

The figures that accompany the written portion of this specification illustrate embodiments and method(s) of use for the present invention, a receptacle for collecting, compacting, and bagging leaves and other yard waste, constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a receptacle for yard waste, and more particularly to a receptacle for collecting, compacting, and bagging leaves and other yard waste as used to improve the ease of adding the bag to the receptacle and removing the bag after compacting.

Figure 1:
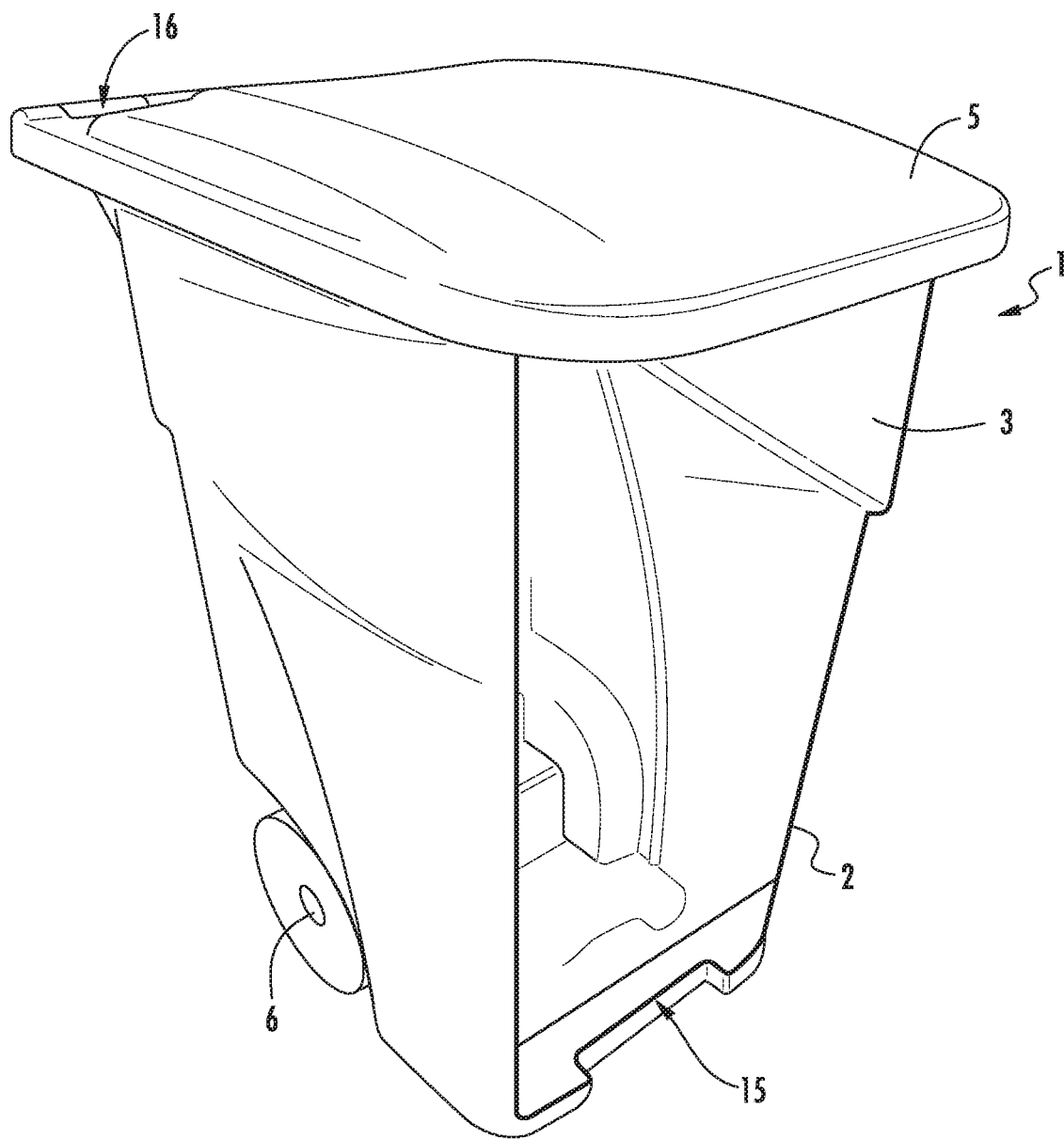
FIG. 1 shows a perspective view illustrating a corner view of the bin displaying the outer and inner area of the bin, with the lid closed.
Figure 2:
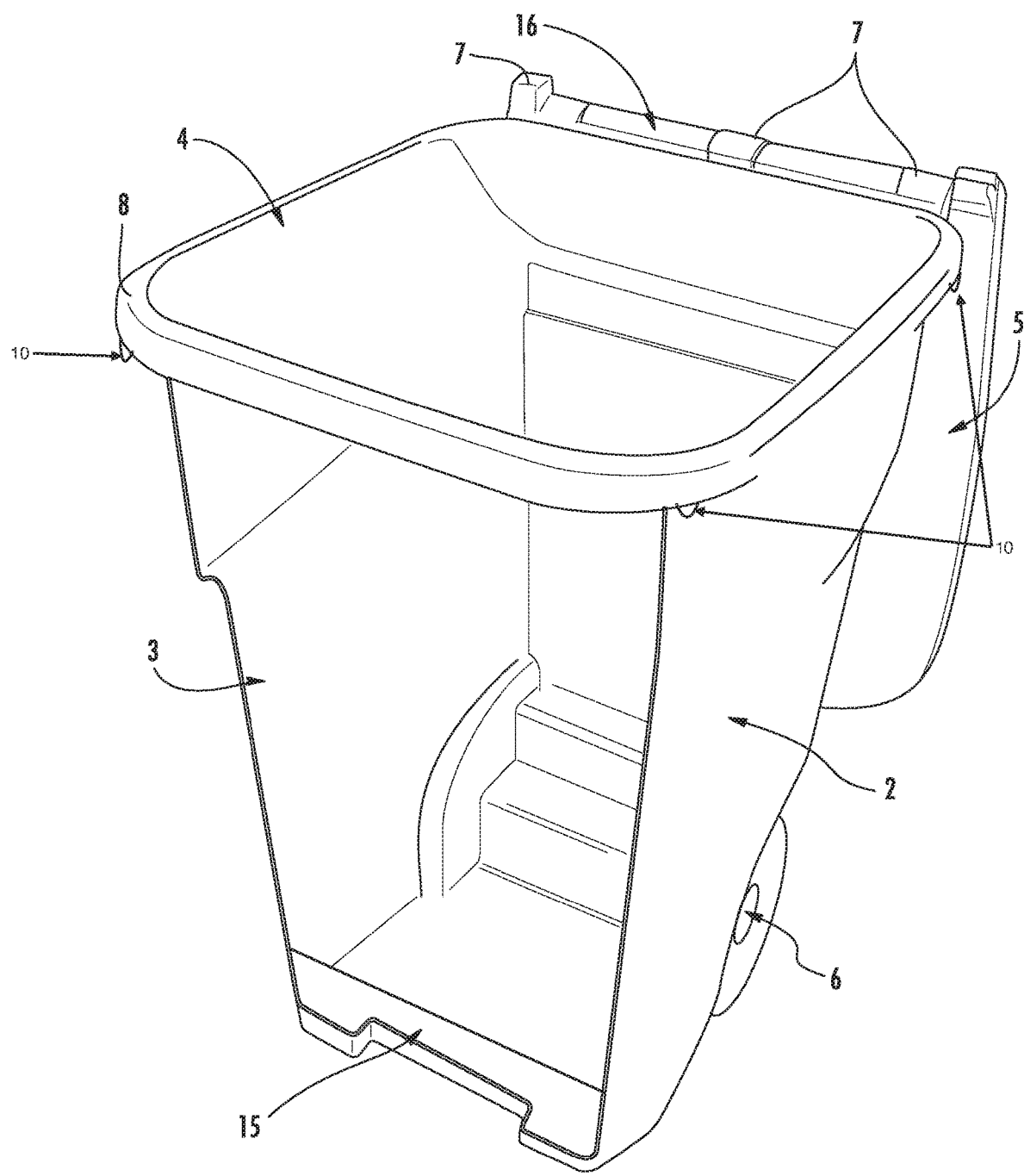
FIG. 2 is a perspective view illustrating an elevated corner view of the bin displaying the outer and inner area of the bin, with the lid open.

Referring to the drawings by numerals of reference there is shown in FIGS. 1-2, the receptacle for collecting, compacting, and bagging leaves and other yard waste is a collecting and bagging bin 1 that preferably resembles a typical trash bin with a volume of thirty or more gallons. The volume is preferably fifty gallons. The collecting and bagging bin 1 has a collecting bin body 2 with a front opening 3 as well as a top opening 4 that is covered by a lid 5. The collecting bin body 2 rests on a pair of transporting wheels 6. The collecting bin 1 can be manufactured in a number of volumes, but is preferably at least 30 gallons. The lid 5 is connected to the body 2 at the back, top edge of the bin body 2 via two or more lid hinges 7. There are preferably three lid hinges 7. The hinges 7 are located around or in between one or two bar handles 16.

The collecting bin body 2 has a lip 15 at the bottom of the front opening 3 so the opening 3 doesn't extend all the way to the bottom of the collecting bin body 2. The lip 15 prevents an unfilled 9 or filled bag 12 from protruding out of the general inner dimensions of the bin body 2. The lip 15 is noticeably higher than the bottom of the bin body 2, but not so high, compared to the overall height of the bin body 2, that it effects the benefit of a user being able to easily remove bagged yard waste 12 out of the front opening 3. The lip 15 is preferably 10% or less of the total height of the bin body 2.

Figure 3:
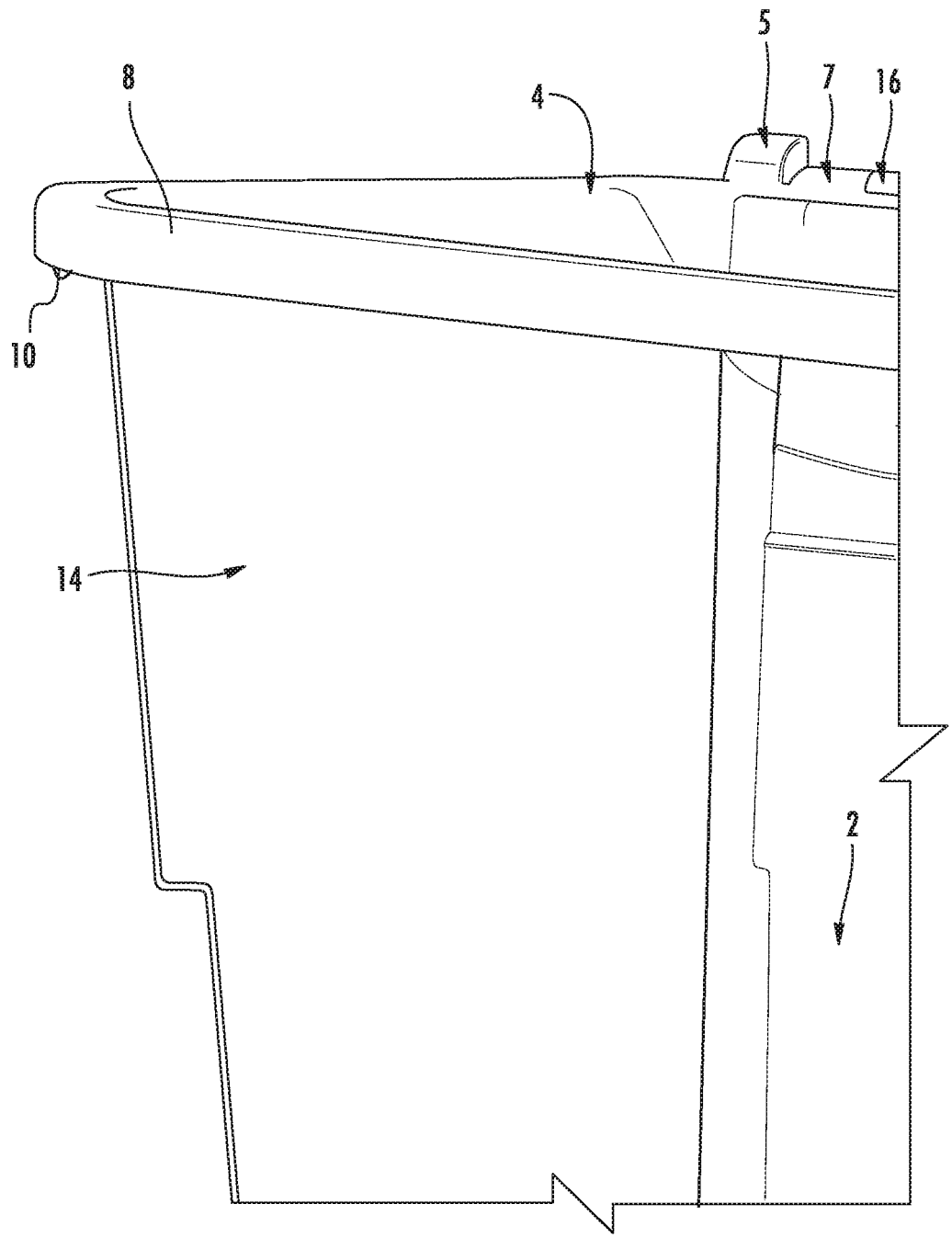
FIG. 3 is a perspective view illustrating a view of the collecting bin displaying the rim and a barb.

As shown in FIG. 3, the bin body bagging rim 8 forms a structure that a conventional yard waste bag 9 is hung from. The bagging rim 8 has at least one bagging barb 10 on the outer, lower edge that hooks the yard waste bag 9, holding it in place as the weight of the yard waste 11 increases inside the bag 9. The bagging rim 8 preferably has four bagging barbs 10, one on each of the four outer corners of the bin body bagging rim 8.

The bagging bin body 2 has an optional attachable/detachable piece 14 that matches the open section 3 on the front of the bin 1. This optional frontpiece 14 can be attached to the bin 1, thereby allowing the bin 1 to function like a traditional trash bin. The optional frontpiece 14 clips or snaps onto and off of the bin body 2. The frontpiece 14, although generally fitting the shape of the bin front cutout 3, would still allow for air to pass from the interior of the bin 1 to the exterior, thereby maintaining the benefit of eliminating air pockets between the yard waste bag 9 and the bagging container 1.

Figure 4:
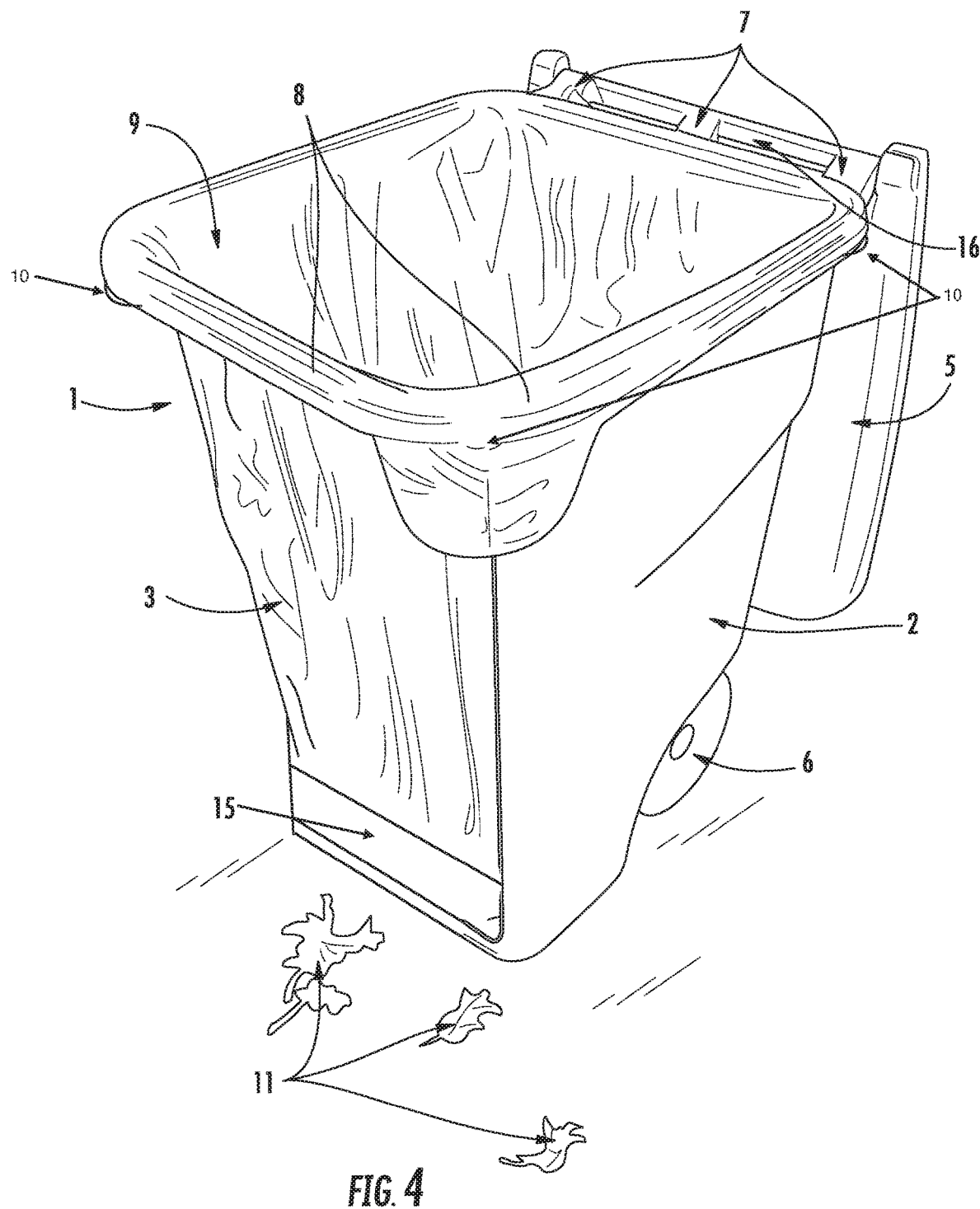
FIG. 4 is a perspective view illustrating a view of the collecting bin with a plastic bag attached to the rim and barb.
Figure 5:
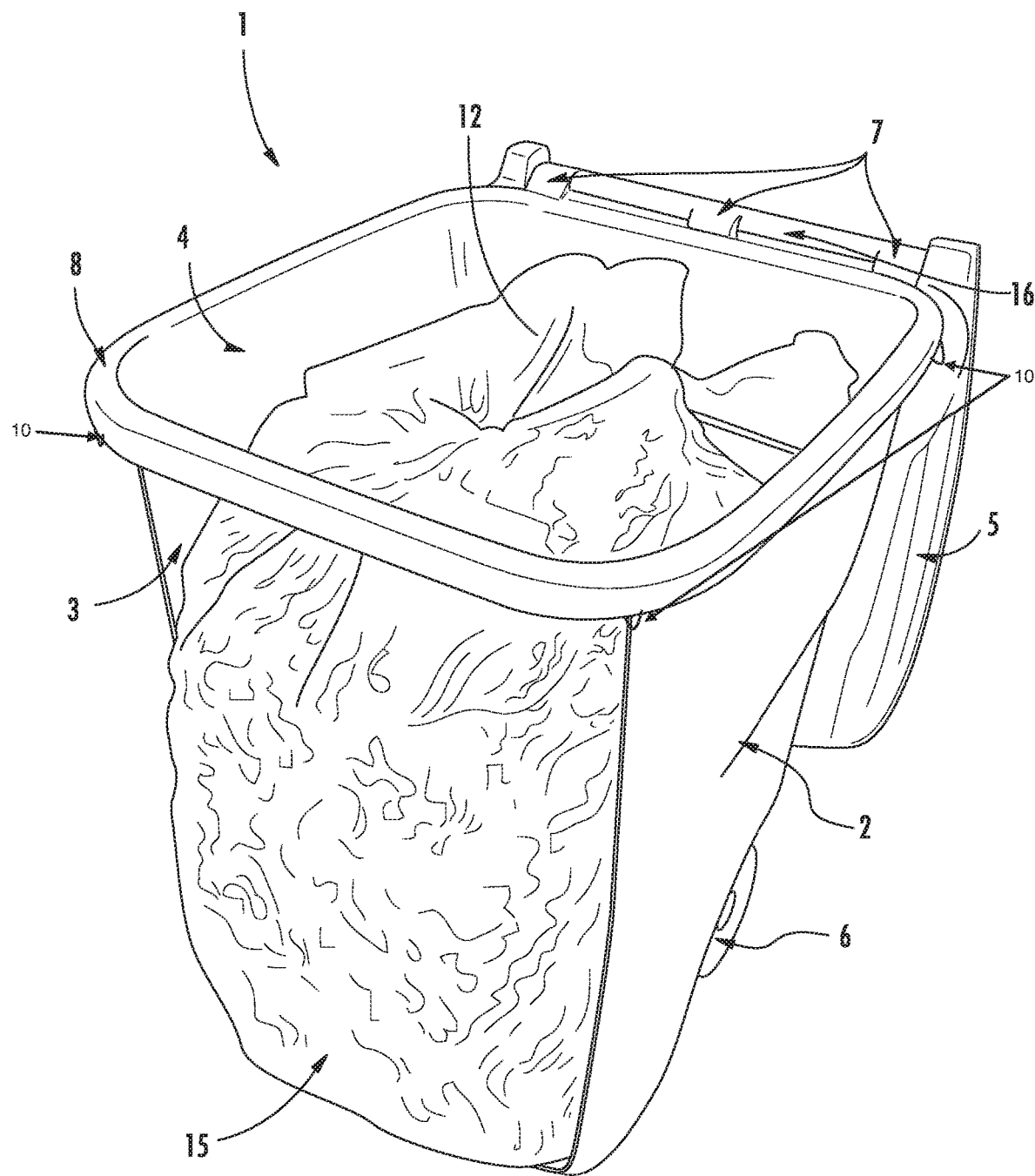
FIG. 5 is a perspective view illustrating a view of the bin displaying the closed bag of collected leaves and yard waste, to be removed through the front (open area).

As shown in FIGS. 4-5, the bagging bin body 2 has an opening in the front 3 to allow the bag 9 to collect leaves and other yard waste 11 without creating the air pockets under the bag 9, inside the bagging bin body 2, that so often cause problems with a traditional trash can. This eliminates the need to re-situate or re-position the bag 9 to eliminate any air pockets that prevent additional leaves or yard waste from being collected in the bag, saving the user time, and preventing the need to fiddle with a heavy bag 9, possibly thereby injuring him or herself.

To operate, the user places a plastic bag 9 inside the collecting bin body 2 and stretches the top of the bag 9 around the bagging rim 8 ensuring that the plastic bag 9 catches the bagging barbs 10. After the bag 9 is attached to the collecting bin 1, the user fills the bin 1 with leaves or other yard waste 11. Once the desired amount of leaves or yard waste 11 is collected, the user will close the bag, typically done by tying both opposing corners of the plastic bag together, to prevent collected yard waste 11 from emptying from the filled and closed collection bag 12.

Figure 6:
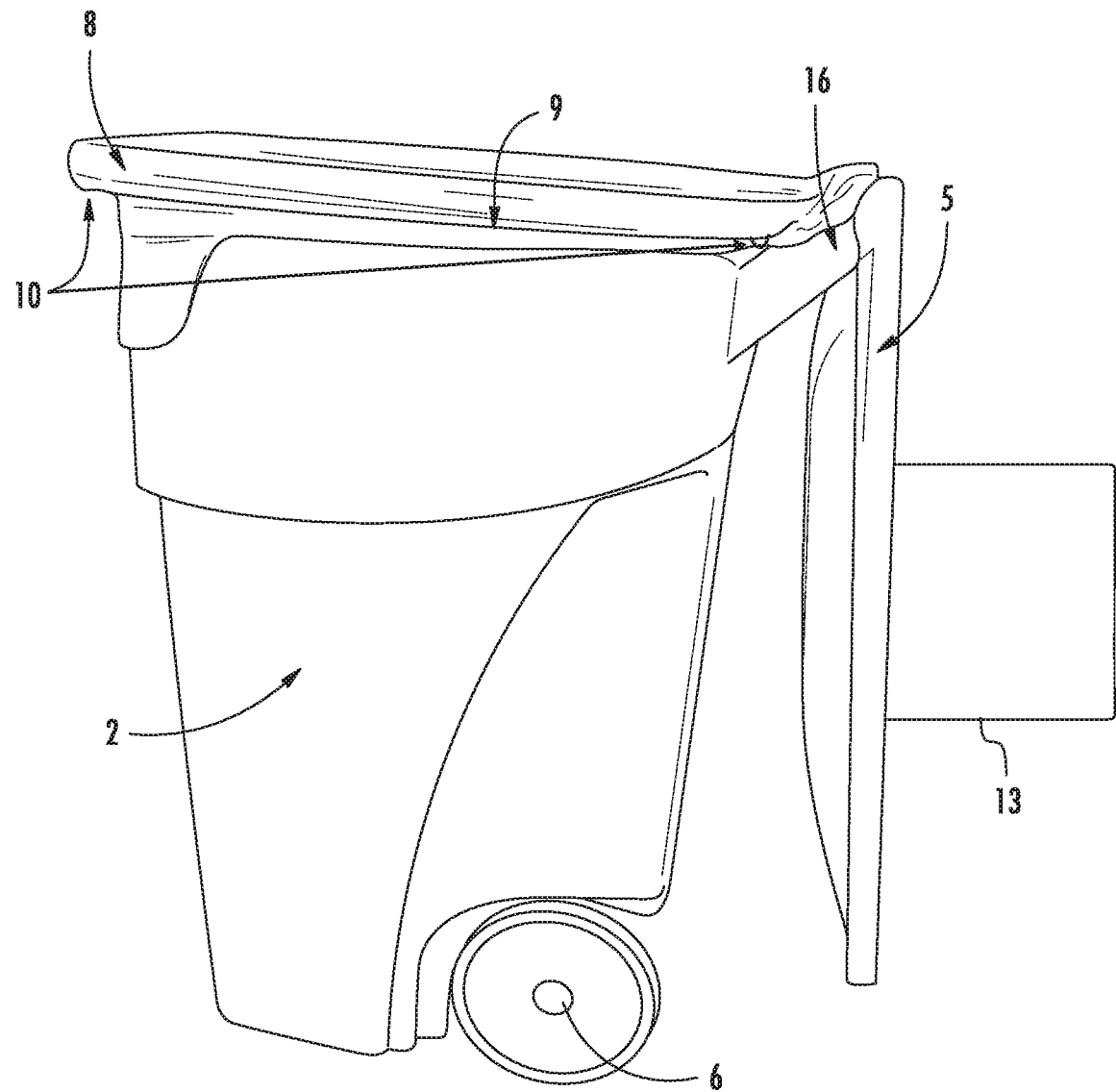
FIG. 6—is a perspective view illustrating a side view of the bin with the open compacting top.

As shown in FIG. 6, the compacting bin lid 5 has an optional compacting component 13 attached to the underside thereon to compact the contents of the trash bag 9 within the bin 1. The optional compacting component 13 attaches to the underside of the lid 5 via clips or snaps.

To compact the leaves/yard waste 11, the user closes the lid 5 along the traditional trash receptacle hinges 7. The bin lid 5 and leaf/yard waste compactor 13 will then compact the leaves or yard waste 11 by pressing down on them securely and evenly across the entire bottom surface of the compacting component 13. After compacting, the user can then add more yard waste 11 to the bag 9. With the lid 5 open, the user will then use traditional methods of placing leaves or other yard waste 11 into the bag 9 within the compacting and collecting bin 1. Depending on the desired amount of leaves or yard waste 11 to be collected, the user will close the compacting lid 5 and repeat the previous steps to add additional leaves or yard waste 11 to the bag 9 until the desired compacted amount is collected.

After the desired amount of leaves or yard waste 11 are collected, the user removes the plastic bag 9 from the bagging rim 8 and barbs 10. The user ties off the bag of leaves or yard waste 12 and then, if desired, positions the sealed bag 12 at its final destination by moving the bin 1 by way of the wheels 6. The closed bag 12 is removed from the bin 1 by way of the front opening 3, which avoids the user having to lift a heavy bag 12 of compacted yard waste vertically to remove it from the receptacle 1.

Each of the components of the bin/receptacle 1 can be constructed using various strong and durable materials, such as plastic, composite, metal, or rubber materials. Different materials, sizes, hinges, and interconnections can be used for all components. The open compartment 3 in the front can be positioned on any of the outer sides and can be various sizes.

Additionally, the bin body 2 may be weighted in the front to create an even weight distribution that compensates for the hole 3 in the front and the optional compacting component 13. This weight could be part of the bin body 2, and would be located in the front section of the bottom of the bin body 2, thus preventing the bin 1 from tipping over with typical or optional components usage.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A receptacle for collecting, compacting, and bagging leaves and other yard waste, comprising:
   (a) a collecting bin body having
      (i) a front opening with a height, a top width, and a bottom width different from the top width;
      (ii) a lip, wherein the lip is located directly below a bottom of the front opening;
      (iii) a top opening;
      (iv) a unitary bagging rim that encompasses the top opening;
      (v) one or more bagging barbs operably positioned on an outer, lower edge of the bagging rim to hook and hold a yard waste bag; and (vi) at least one bar handle positioned at a back, top edge of the collecting bin body;
(b) a pair of transporting wheels,
wherein the pair of transporting wheels are operably connected to the collecting bin body at a back, lower side of the collecting bin body so that the collecting bin body is tiltable on the pair of transporting wheels;
(c) a lid having at least two hinges,
wherein the lid is operably connected to the collecting bin body at a back, top side of the collecting bin body via the at least two hinges, and
wherein the at least two hinges are positioned in line with the at least one bar handle.

2. The receptacle for collecting, compacting, and bagging leaves and other yard waste according to claim 1, wherein the collecting bin body has a volume of fifty gallons.

3. The receptacle for collecting, compacting, and bagging leaves and other yard waste according to claim 1, wherein the collecting bin body has a volume of thirty or more gallons.

4. The receptacle for collecting, compacting, and bagging leaves and other yard waste according to claim 1, wherein the lip of the collecting bin body is 10% or less of a total height of the collecting bin body.

5. The receptacle for collecting, compacting, and bagging leaves and other yard waste according to claim 1, the receptacle further comprising:
(d) a detachable panel having a height, a top width, and a bottom width,
wherein the height, the top width, and the bottom width of the detachable panel are approximately the same as the height, the top width, and the bottom width of the front opening of the collecting bin body, and
wherein the detachable panel is operably attachable and detachable to the collecting bin body so as to cover the front opening of the collecting bin body.

6. The receptacle for collecting, compacting, and bagging leaves and other yard waste according to claim 5,
wherein the detachable panel is operably attachable and detachable to the collecting bin body via snaps or clips.

7. The receptacle for collecting, compacting, and bagging leaves and other yard waste according to claim 1, the receptacle further comprising:
(d) a compacting component,
wherein the compacting component is operably connectable to an underside of the lid.

8. The receptacle for collecting, compacting, and bagging leaves and other yard waste according to claim 7,
wherein the compacting component is operably connectable to the underside of the lid via snaps or clips.

9. The receptacle for collecting, compacting, and bagging leaves and other yard waste according to claim 1,
wherein the collecting bin body is weighted along the rim of the collecting bin body with sufficient extra material to prevent the receptacle from tipping over during normal use.

10. The receptacle for collecting, compacting, and bagging leaves and other yard waste according to claim 1,
wherein there are at least four bagging barbs, operably positioned so that there is one bagging barb on the outer, lower edge of each corner of the bagging rim to hook and hold a yard waste bag.

11. The receptacle for collecting, compacting, and bagging leaves and other yard waste according to claim 1,
wherein the receptacle is formed from one or more materials selected from the group consisting of plastic, composite, metal, and rubber.

12. The receptacle for collecting, compacting, and bagging leaves and other yard waste according to claim 1,
wherein the front opening is located on a right side of the collecting bin body.

13. The receptacle for collecting, compacting, and bagging leaves and other yard waste according to claim 1,
wherein the front opening is located on a left side of the collecting bin body.

14. A receptacle for collecting, compacting, and bagging leaves and other yard waste, comprising:
(a) a collecting bin body having
(i) a front opening with a height, a top width, and a bottom width different from the top width;
(ii) a lip, wherein the lip is located directly below a bottom of the front opening,
wherein the lip of the collecting bin body is approximately 20 percent or less of a total height of the collecting bin body;
(iii) a top opening;
(iv) a unitary bagging rim that encompasses the top opening;
(v) two bagging barbs operably positioned on opposites sides of an outer, lower edge of the bagging rim to hook and hold a yard waste bag; and
(vi) at least one bar handle positioned at a back, top edge of the collecting bin body;
(b) a pair of transporting wheels,
wherein the pair of transporting wheels are operably connected to the collecting bin body at a back, lower side of the collecting bin body so that the collecting bin body is tiltable on the pair of transporting wheels;
(c) a lid having at least two hinges,
wherein the lid is operably connected to the collecting bin body at a back, top side of the collecting bin body via the at least two hinges, and
wherein the at least two hinges are positioned in line with the at least one bar handle;
(d) a detachable panel having a height, a top width, and a bottom width,
wherein the height, the top width, and the bottom width of the detachable panel are the same as the height, the top width, and the bottom width of the front opening of the collecting bin body, and
wherein the detachable panel is operably attachable and detachable to the collecting bin body so as to cover the front opening of the collecting bin body; and
(e) a compacting component,
wherein the compacting component is operably connectable to an underside of the lid, and
wherein the receptacle is formed from one or more materials selected from the group consisting of plastic, composite, metal, and rubber.

15. The receptacle for collecting, compacting, and bagging leaves and other yard waste according to claim 14, wherein the collecting bin body has a volume of fifty gallons.

16. The receptacle for collecting, compacting, and bagging leaves and other yard waste according to claim 14, wherein the collecting bin body has a volume of thirty or more gallons.

17. The receptacle for collecting, compacting, and bagging leaves and other yard waste according to claim 14,
wherein the detachable panel is operably attachable and detachable to the collecting bin body via snaps or clips.

18. The receptacle for collecting, compacting, and bagging leaves and other yard waste according to claim 14, wherein the compacting component is operably connectable to the underside of the lid via snaps or clips.

19. The receptacle for collecting, compacting, and bagging leaves and other yard waste according to claim 14, wherein the collecting bin body is weighted along the rim of the collecting bin body with sufficient extra material to prevent the receptacle from tipping over during normal use.

\* \* \* \* \*